US008311455B2

(12) United States Patent
Tsui

(10) Patent No.: US 8,311,455 B2
(45) Date of Patent: Nov. 13, 2012

(54) DRIVING FORCE MEMBER

(75) Inventor: Samuel Wai Keung Tsui, Perth (AU)

(73) Assignee: Katun Corporation, Minneapolis, MN (US)

( * ) Notice: Subject to any disclaimer, the term of this patent is extended or adjusted under 35 U.S.C. 154(b) by 0 days.

(21) Appl. No.: 12/647,063

(22) Filed: Dec. 24, 2009

(65) Prior Publication Data

US 2010/0303501 A1     Dec. 2, 2010

Related U.S. Application Data

(63) Continuation of application No. PCT/AU2008/000934, filed on Jun. 26, 2008.

(30) Foreign Application Priority Data

Jun. 27, 2007   (AU) ................................ 2007903475

(51) Int. Cl.
    *G03G 15/00*    (2006.01)
(52) U.S. Cl. ....................................... 399/167; 399/117
(58) Field of Classification Search .................. 399/167, 399/117
    See application file for complete search history.

(56) References Cited

U.S. PATENT DOCUMENTS

| 5,160,005 A | 11/1992 | Burch |
| 6,035,159 A * | 3/2000 | Azuma et al. ................. 399/111 |
| 6,173,146 B1 * | 1/2001 | Wang et al. .................. 399/265 |
| 6,684,041 B2 * | 1/2004 | Yokomori et al. ............ 399/167 |
| 7,537,410 B2 * | 5/2009 | Parisi et al. .................... 403/383 |
| 2003/0223772 A1 | 12/2003 | Kubota |
| 2004/0013446 A1 * | 1/2004 | Morioka et al. .............. 399/111 |
| 2009/0279917 A1 * | 11/2009 | Tsui et al. ..................... 399/111 |

FOREIGN PATENT DOCUMENTS

| EP | 1232712 B1 | 7/2005 |
| JP | 2004036829 A | 2/2004 |
| WO | 2008052260 A1 | 5/2008 |

OTHER PUBLICATIONS

International Search Report for PCT/AU2008/000934 dated Aug. 20, 2008.

* cited by examiner

*Primary Examiner* — Joseph S Wong
(74) *Attorney, Agent, or Firm* — Schwegman, Lundberg & Woessner, P.A.

(57) ABSTRACT

A driving force member for receiving rotational driving force includes a base portion, a projection portion including three planar surfaces, the three planar surfaces arranged such that if they were extended and viewed in cross section perpendicular to the axis of the projection, they would intersect at 120 degrees in the form of an equilateral triangle, the three planar surfaces corresponding to a partial length of each side of the triangle respectively and offset from the center of each respective side of the triangle, and three joining portions joining each of the three planar surfaces, the three joining portions lying entirely within the equilateral triangle.

21 Claims, 5 Drawing Sheets

DRIVING FORCE MEMBER

CROSS REFERENCE TO RELATED APPLICATIONS

This application is a continuation of PCT/AU2008/000934, filed Jun. 26, 2008, and titled "A Driving Force Member", which claims priority under 35 U.S.C. §119 to Australian Application No. AU 2007903475, filed Jun. 27, 2007, the entire contents of each are hereby incorporated by reference.

FIELD

The invention relates to a driving force member for receiving and transmitting a driving force. The driving force member is particularly suited to receive a rotational driving force transferred by way of an additional driving force member taking the form of either a twisted or non-twisted recess.

BACKGROUND

The following discussion of the background of the invention is intended to facilitate an understanding of the present invention. However, it should be appreciated that the discussion is not an acknowledgment or admission that any of the material referred to was published, known or part of the common general knowledge in any jurisdiction as at the priority date of the application.

Driving force members are commonly used in any situation where a rotational driving force needs to be transferred from one article to components of another article. In many cases, the two driving force members are configured such that the internal profile of one is matched to the external profile of the other. This match in profiles is often an identical match.

Recently, in the field of process and developer cartridges, driving force members included to transfer substantially coaxial rotational driving force from an image processing apparatus to the photosensitive drum, or like components, have been implemented in the form of a twisted projection to be received within a twisted recess. While the use of driving force members having twisted profiles have produced benefits in the form of the driving force member being self-centring and also assisting in preventing disengagement of the driving force members while a rotational driving force is being applied, it has also introduced further complications. For instance:
  Existing driving force members not having a twisted profile can not be used with a driving force member having a twisted profile because the point of engagement between the two driving force members is insufficient to facilitate the transfer of the rotational driving force;
  A driving force member having a twisted profile requires further precision tooling equipment such as specialised plastic injection moulding machinery, to meet the exacting tolerances the twisted profile sets; and
  A driving force member in the form of a projection capable of engaging with a recess must be substantially as long as the recess is deep to enable full engagement.

It is therefore an object of the present invention to create a driving force member that seeks to provide at least one of the advantages of a driving force member having a twisted profile while overcoming at least one of the disadvantages of a driving force member having a twisted profile and that can be used with driving force members having either a twisted recess or non-twisted recess profile.

It should be appreciated that while the following description will be made in relation to image processing equipment, it is not restricted to use and may be used in any circumstance where rotational driving force is required to be imparted from one component to another.

SUMMARY

Throughout this document, unless otherwise indicated to the contrary, the terms "comprising", "consisting of", and the like, are to be construed as non-exhaustive, or in other words, as meaning "including, but not limited to".

In accordance with a first aspect of the invention there is a driving force member, the driving force member comprising
  a base portion,
  a projection portion comprising three planar surfaces, the three planar surfaces arranged such that if they were extended and viewed in cross section perpendicular to the axis of the projection, they would intersect at 120 degrees in the form of an equilateral triangle, the three planar surfaces corresponding to a partial length of each side of the triangle respectively and offset from the center of each respective side of the triangle,
  three joining portions joining each of the three planar surfaces, the three joining portions lying entirely within the equilateral triangle.

Preferably, the three planar surfaces correspond to substantially half of the length of each side of the equilateral triangle respectively.

Preferably, the three planar surfaces correspond to less than half the length of each side of the equilateral triangle respectively.

More preferably, the three joining portions are substantially concave. Alternatively, the three joining portions are substantially convex. Alternatively, the three joining portions are substantially straight. In another alternative, the three joining portions are a combination of concave, convex and substantially straight.

Preferably, driving force member contains an electroconductive portion.

Preferably, the driving force member is formed of an electroconductive material.

More preferably, the three planar surfaces are equally and radially spaced in the rotational direction of the driving force member.

In accordance with a second aspect of the present invention, there is a photosensitive drum, having a driving force member for receiving rotational driving force, the driving force member being located at one longitudinal end of the photosensitive drum, the driving force member comprising,
  a base portion,
  a base portion,
  a projection portion comprising three planar surfaces, the three planar surfaces arranged such that if they were extended and viewed in cross section perpendicular to the axis of the projection, they would intersect at 120 degrees in the form of an equilateral triangle, the three planar surfaces corresponding to a partial length of each side of the triangle respectively and offset from the center of each respective side of the triangle,
  three joining portions joining each of the three planar surfaces, the three joining portions lying entirely within the equilateral triangle.

Preferably, the three planar surfaces correspond to substantially half of the length of each side of the equilateral triangle respectively.

Preferably, the three planar surfaces correspond to less than half the length of each side of the equilateral triangle respectively.

More preferably, the three joining portions are substantially concave. Alternatively, the three joining portions are substantially convex. Alternatively, the three joining portions are substantially straight. In another alternative, the three joining portions are a combination of concave, convex and substantially straight.

Preferably, driving force member contains an electroconductive portion.

Preferably, the driving force member is formed of an electroconductive material.

More preferably, the three planar surfaces are equally and radially spaced in the rotational direction of the driving force member.

In accordance with a third aspect of the present invention, there is a driving force member for receiving rotational driving force, comprising
- a base portion,
- a core portion,
- three lugs projecting from the core portion, each of the three lugs comprising a planar surface, the three planar surfaces arranged such that if they were extended and viewed in cross section perpendicular to the axis of the projection, they would intersect at 120 degrees in the form of an equilateral triangle, the three planar surfaces corresponding to a partial length of each side of the triangle respectively and offset from the center of each respective side of the triangle,
- three joining portions joining each of the three planar surfaces, the three joining portions lying entirely within the equilateral triangle.

Preferably, the three planar surfaces correspond to substantially half of the length of each side of the equilateral triangle respectively.

Preferably, the three planar surfaces correspond to less than half the length of each side of the equilateral triangle respectively.

More preferably, the three joining portions are substantially concave. Alternatively, the three joining portions are substantially convex. Alternatively, the three joining portions are substantially straight. In another alternative, the three joining portions are a combination of concave, convex and substantially straight.

Preferably, driving force member contains an electroconductive portion.

Preferably, the driving force member is formed of an electroconductive material.

More preferably, the three planar surfaces are equally and radially spaced in the rotational direction of the driving force member.

BRIEF DESCRIPTION OF THE DRAWINGS

The invention will now be described, by way of example only, with reference to the accompanying drawings, in which.

DETAILED DESCRIPTION

Figure 1:
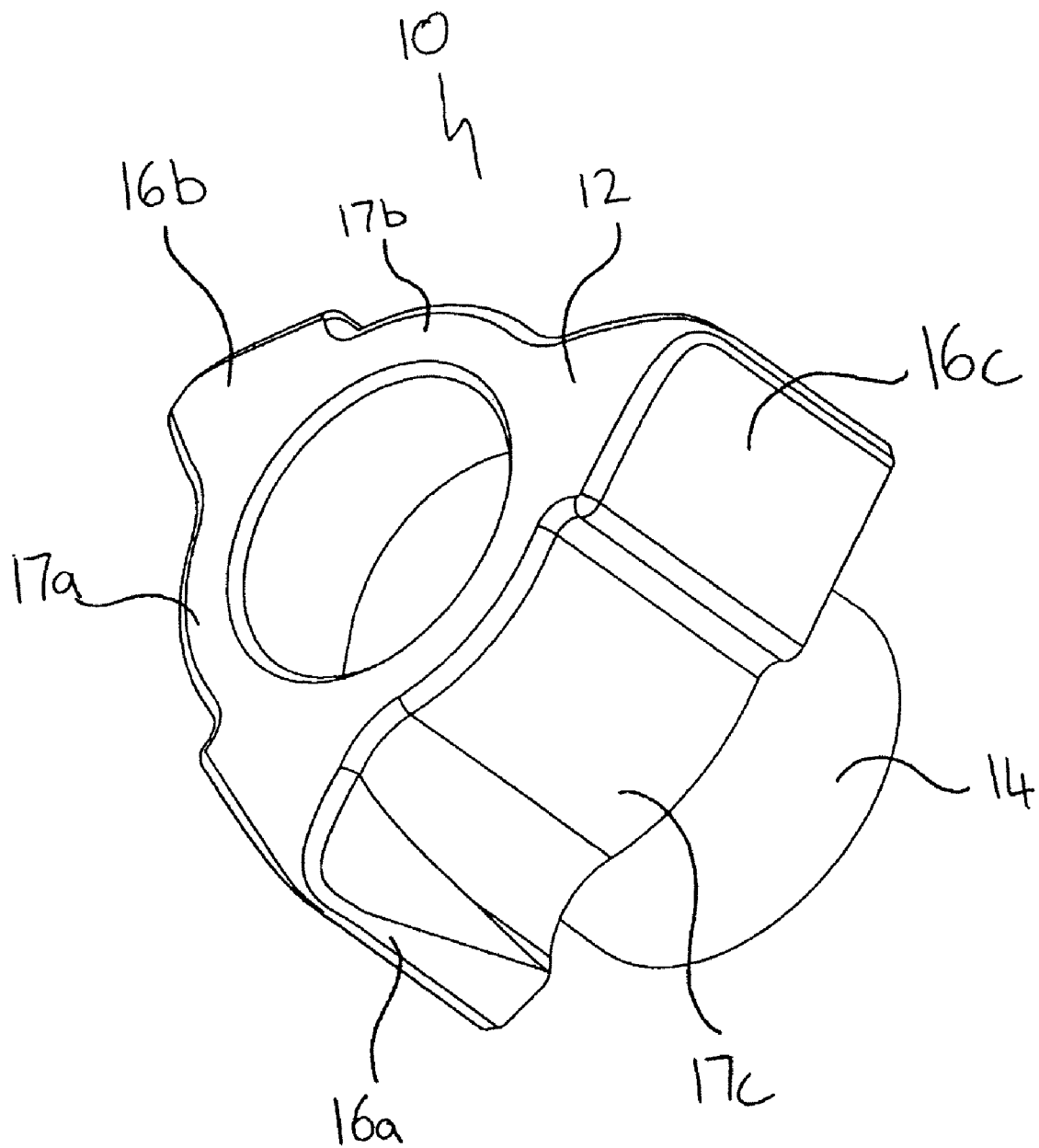
FIG. 1 is a perspective view of a driving force member according to a first embodiment of the present invention.

In accordance with a first embodiment of the invention there is a first driving force member 10. The first driving force member 10 comprises a projection 12 and a base 14. The projection 12 is attached to the base 14 such that it has a larger diameter than the base 14 and three side portions 16a, 16b and 16c are exposed. The three side portions 16a, 16b and 16c are projected outwardly from the projection 12 at approximately 120 degree intervals. The three side portions 16a, 16b and 16c are in the form of lugs.

The three side portions 16a, 16b and 16c extend perpendicularly outwardly from the projection 12 near the base 14 and then taper slightly inwardly as they extend in the longitudinal direction A along the projection 12. The three side portions 16a, 16b and 16c are joined by three corresponding joining portions 17a, 17b and 17c provided on the projection 12. In this embodiment the joining portions 17a, 17b and 17c are substantially concave in shape, however it is intended that the joining portions may have any manner of form complying with the rule that the joining portions do not extend farther than the three side portions which is inboard of extensions of the three side portions 16a, 16b and 16c.

The three side portions 16a, 16b and 16c may comprise a variety of faces, any combination of which would be obvious to the person skilled in the art.

Figure 2:
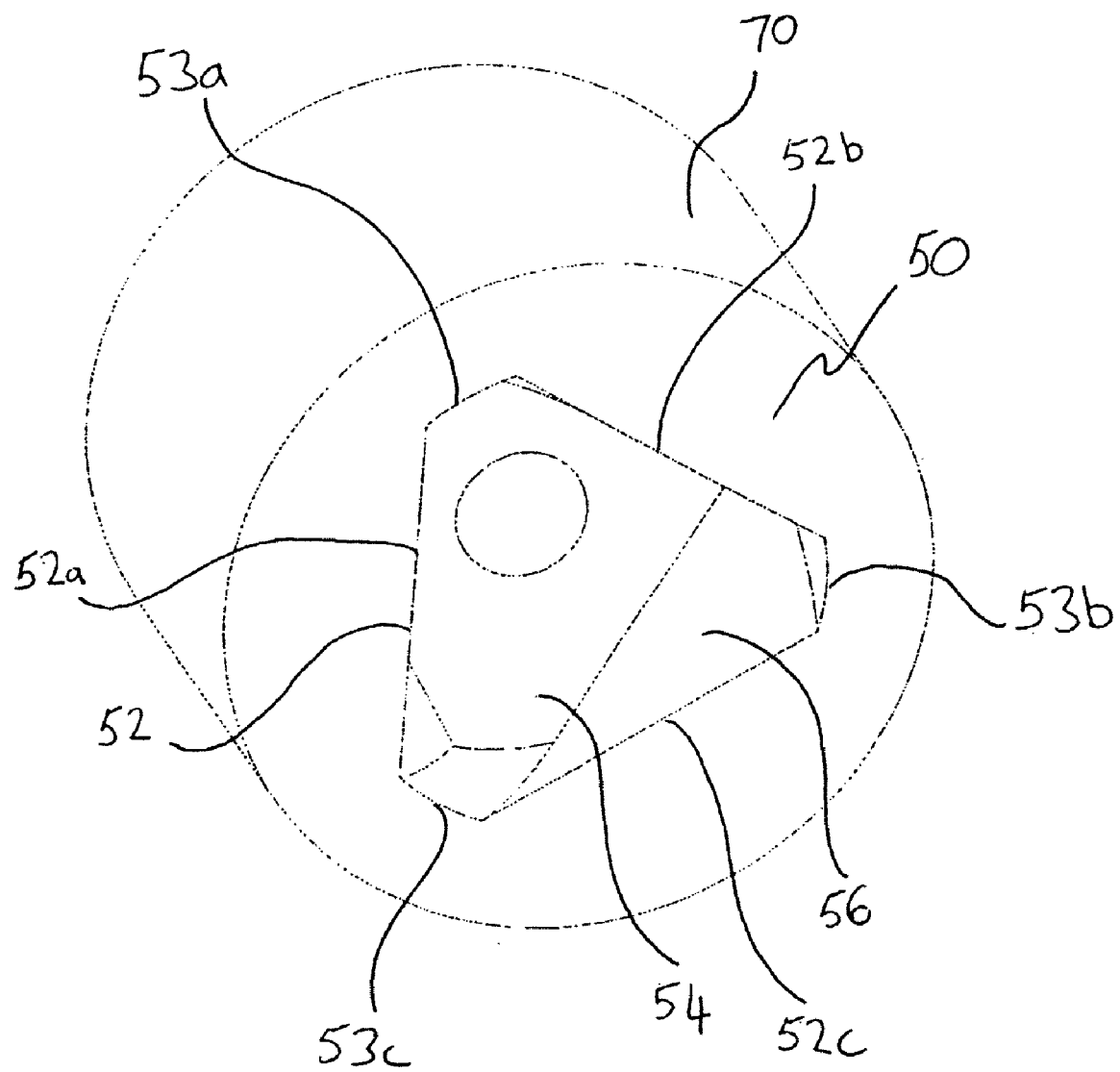
FIG. 2 is perspective view of a twisted recess suitable for engagement with the driving force member of FIG. 1.
Figure 3:
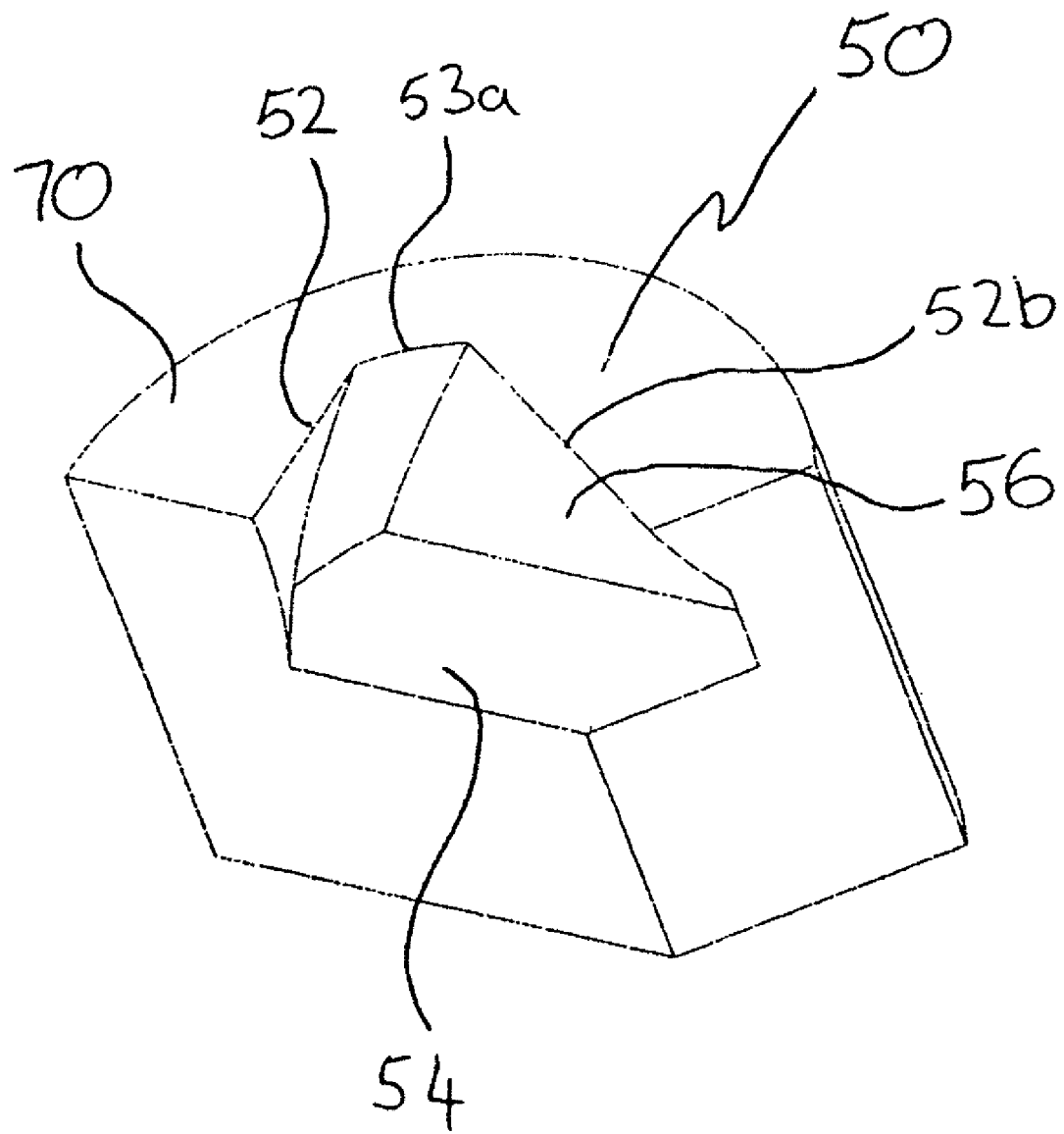
FIG. 3 is a cut away perspective view of the twisted recess of FIG. 2.

Preferably, the projection 12 is suited for engagement with a twisted recess 50 as shown in FIG. 2, the twisted recess comprises an entrance aperture 52, a bottom wall 54 and at least one twisted wall 56 extending there-between. The entrance aperture is preferably co-planar with a planar outer surface of a drive gear 70 surrounding the twisted recess 50, the drive gear effecting to transfer a rotation driving force to the twisted recess 50.

The bottom hole 54 of the twisted recess 50 is substantially similar in size and shape and substantially coaxial and parallel to the entrance aperture 52, however the bottom wall 54 is rotated with respect to the entrance aperture 52 such that the twisted wall 56 extending there-between is twisted.

The entrance aperture 52 is preferably triangular in shape, having a rim comprising of three edge portions 52a, 52b and 52c joined at the corners by three radius portions 53a, 53b and 53c. Each edge portion defines the boundary between the planar outer surface of the drive gear 70 and a twisted wall 56 of the twisted recess, forming an edge angle. As a result of the twisted characteristic of the twisted wall 56, the edge angle varies along the length of the edge portion 52a, 52b or 52c and is approximately 90° at a point half way along the edge portion 52a, 52b or 52c.

Figure 4:
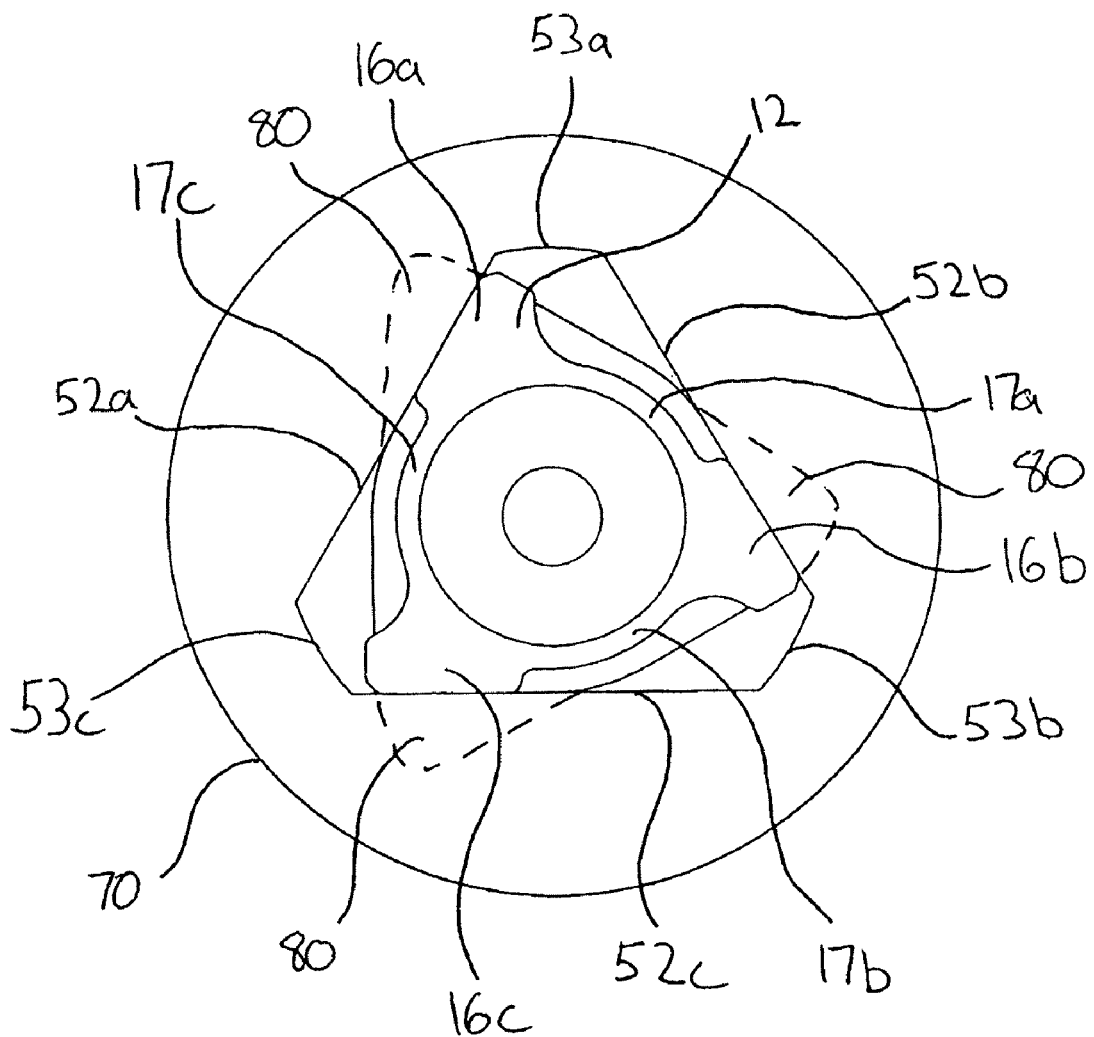
FIG. 4 is a top view of the driving force member 1 in engagement with the twisted recess of FIG. 2.

As shown in FIG. 4, when viewed from directly above, the twisted wall 56 is visible at one side of the half-way point of the edge portion 52a, 52b and 52c as the edge angle is greater than 90°, while on the other side of the half-way point of the edge portion 52a, 52b and 52c the edge angle is less than 90° and the twisted wall 56 is not visible from directly above. The half of the edge portion 52a, 52b and 52c that is not viewable from directly above will be referred to as the undercut portion 80.

As can be seen in FIG. 4, the projection 12 is engaged with the twisted recess 50 in the following manner. The projection 12 enters the twisted recess 50 through the entrance aperture 52. The three side portions 16a, 16b and 16c contact the edge portions 52a, 52b and 52c respectively while the three joining portions 17a, 17b and 17c are adjacent to, but not in contact with the twisted wall 56. The point at which contact occurs between a side portion 16a, 16b or 16c and an edge portion 52a, 52b or 52c is directly adjacent to an undercut portion 80.

The undercut portion 80 is represented by broken lines in FIG. 4 as it is not directly visible from above. The side portions 16a, 16b and 16c do not contact more than half the length of an edge portion 52a, 52b or 52c measured in a direction perpendicular to the depth of the twisted recess 50.

Thus, a driving force may be transferred from the twisted recess 50 to the projection 12 as the twisted recess 50 rotates while the three side portions 16a, 16b and 16c are in contact with the edge portions 52a, 52b and 52c respectively.

The twisted recess 50 is generally larger in size than the projection 12, this can be seen by viewing FIG. 4. As can be seen the superscribed circle of the projection 12 is larger than the inscribed circle of the twisted recess 50, however less than the superscribed circle of the twisted recess 50.

The twisted recess 50 rotates under the power of an external drive source (not shown), with the projection 12 in engagement as described above. As the twisted recess 50 rotates, driving force is transferred to the projection 12 by the three side portions 16a, 16b and 16c through contact with the edge portions 52a, 52b and 52c respectively.

As the first driving force member 10 contacts the twisted recess 50 at the edge portions 52a, 52b and 52c, the first driving force member 10 may be of any shape desired, allowing specifically for a simple shape which is easy to manufacture, for example by plastic injection moulding.

The first driving force member 10 may be coaxially connected to a rotatable member such as a photosensitive drum (not shown) through the base 14. In this manner, when the projection 12 receives a rotational driving force from the twisted recess 50, the rotational driving force can be transferred from the projection 12, to the photosensitive drum, thus enacting rotation of the photosensitive drum.

Figure 5:
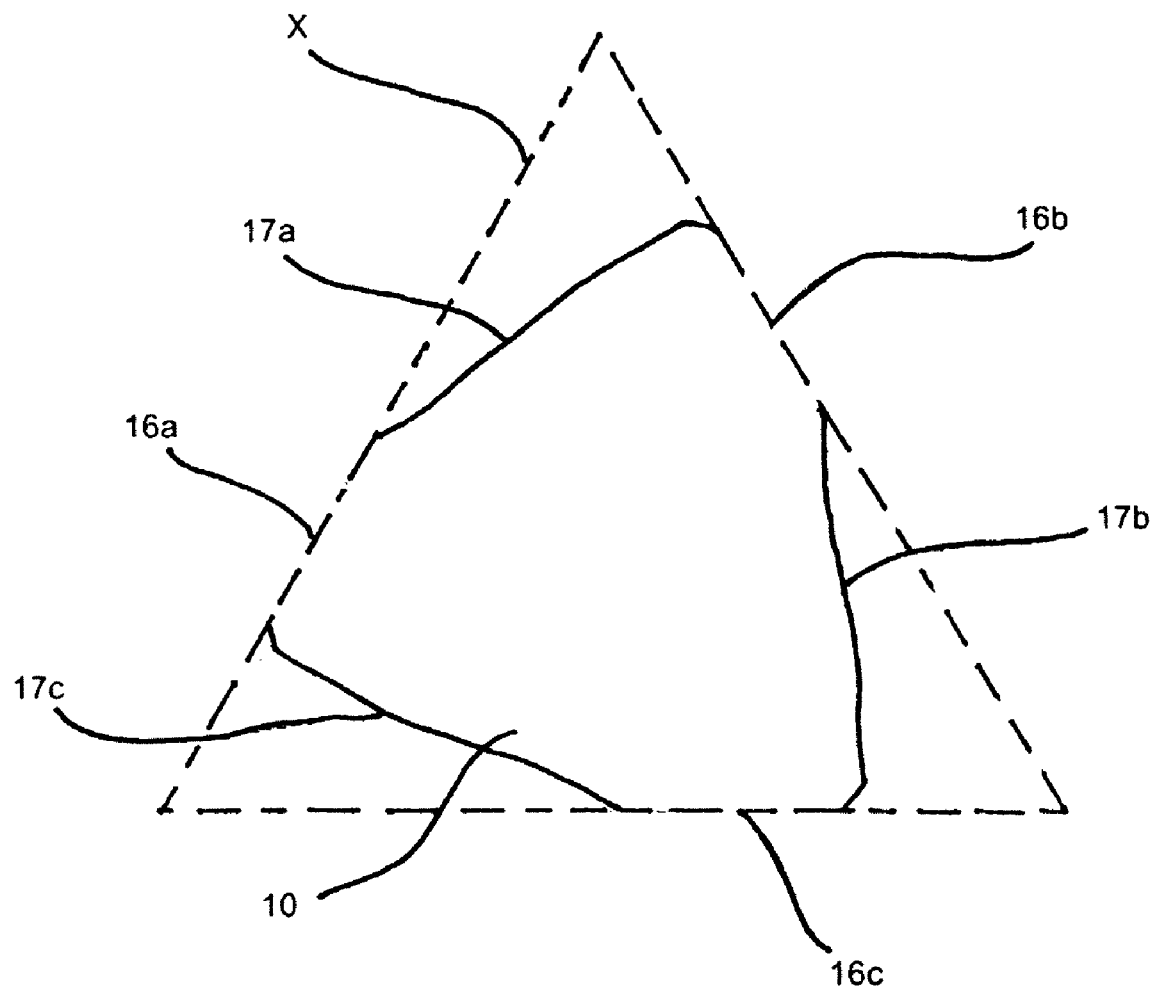
FIG. 5 is a top view of the driving force member of FIG. 1.

As shown in FIG. 5, if the side portions 16a, 16b and 16c which are in the form of planar surfaces, of the driving force member 10 are extended and viewed in cross section perpendicular to the axis of the driving force member, they would intersect at 120 degrees in the form of an equilateral triangle X. The three side portions 16a, 16b and 16c corresponding to a partial length of each side of the triangle respectively and offset from the center of each respective side of the triangle. The side portions 16a, 16b and 16c are joined by the three joining portions 17a, 17b and 17c A potential use for a first driving force member 10 according to a first embodiment of the present invention is in a printer cartridge. In that instance the first driving force member 10 may be used to transfer rotational driving force to a photosensitive drum from an image forming apparatus to which the printer cartridge is mounted. It is possible that the first driving force member comes into engagement with a recess when the printer cartridge is fully inserted into the machine.

It should be appreciated by the person skilled in the art that the above invention is not limited to the embodiment described. In particular, the following modifications and improvements may be made without departing from the scope of the present invention:

The profile of the three side portions may differ substantially from that described, and still provide contact portions for engagement with the rim of a twisted recess.

More or less than three contact portions may be provided on the projection.

The first driving force member 10 may include an electroconductive portion or be formed completely from an electrically conductive material. This allows the first driving force member to ground electrical components to which it is connected.

Although described with reference to the projection 12 acting to receive a driving force, it is also possible that the projection 12 may transmit driving force.

The first driving force member 10 may be attached to any member requiring rotation, including but not limited to, a developer roller or charge roller.

The recess 50 may take any configuration that allows the rim to engage with at least one line contact portion on the projection 12.

The side portions 16a, 16b and 16c may take any configuration including a taper in the opposite direction to that described above.

The side portions 16a, 16b and 16c may be of any different size, so long as they maintain enough contact with the twisted recess 50 so as to effectively receive a driving force.

It should be further appreciated by the person skilled in the art that the features described in one embodiment, where not mutually exclusive or alternatives, may be combined with features described in other embodiments described to create yet further embodiments that fall within the scope of the present invention.

I claim:

1. A driving force member for receiving rotational driving force, comprising:
    a base portion having a perimeter;
    a projection portion that extends beyond the perimeter of base portion in a direction generally perpendicular to a longitudinal axis of the base portion, comprising three planar surfaces, each of the three planar surfaces forming portions of three sides of an equilateral triangle, respectively, each of the three planar surfaces correspond to a first portion of the length of the three respective sides of the equilateral triangle, and each planar surface is offset from the center of each respective side of the triangle; and
    three joining portions joining each of the three planar surfaces, each of the three joining portions are recessed relative to planar surface adjacent to the respective joining portion, each of the three joining portions extend from near the center of the respective sides of the equilateral triangle and one of the planar surfaces toward another of the planar surfaces, and the three joining portions lay entirely within the equilateral triangle; wherein the three joining portions are one or more of substantially concave or substantially convex.

2. A driving force member according to claim 1, wherein the three planar surfaces correspond to substantially half of the length of each side of the equilateral triangle respectively.

3. A driving force member according to claim 1, wherein the three planar surfaces correspond to less than half the length of each side of the equilateral triangle respectively.

4. A driving force member according to claim 1, wherein one joining portion of the three joining portions is substantially concave, and one is substantially convex.

5. A driving force member according to claim 1, wherein the driving force member contains an electroconductive portion.

6. A driving force member according to claim 1, wherein the driving force member is formed of an electroconductive material.

7. A driving force member according to claim 1, wherein the three planar surfaces are equally and radially spaced in the rotational direction of the driving force member.

8. A photosensitive drum, including a driving force member for receiving rotational driving force, the driving force member being located at one longitudinal end of the photosensitive drum, the driving force member comprising:

a base portion having a perimeter;

a projection portion that extends beyond the perimeter of the base portion in a direction generally perpendicular to a longitudinal axis of the base portion, comprising three planar surfaces, each of the three planar surfaces forming portions of three sides of an equilateral triangle, respectively, each of the three planar surfaces correspond to a first portion of the length of the three respective sides of the equilateral triangle, and each planar surface is offset from the center of each respective side of the triangle; and three joining portions joining each of the three planar surfaces, each of the three joining portions are recessed relative to the planar surface adjacent to the respective joining portion, each of the three joining portions extend from near the center of the respective sides of the equilateral triangle and one of the planar surfaces toward another of the planar surfaces, and the three joining portions lay entirely within the equilateral triangle; wherein the three joining portions are one or more of substantially concave or substantially convex.

9. A photosensitive drum according to claim 8, wherein the three planar surfaces correspond to substantially half of the length of each side of the equilateral triangle respectively.

10. A photosensitive drum according to claim 8, wherein the three planar surfaces correspond to less than half the length of each side of the equilateral triangle respectively.

11. A photosensitive drum according to claim 8, wherein one joining portion of the three joining portions is substantially concave and one is substantially convex.

12. A photosensitive drum according to claim 8, wherein the driving force member contains an electroconductive portion.

13. A photosensitive drum according to claim 8, wherein the driving force member is formed of an electroconductive material.

14. A photosensitive drum according to claim 8, wherein the three planar surfaces are equally and radially spaced in the rotational direction of the driving force member.

15. A driving force member for receiving rotational driving force, comprising:

a core portion having a perimeter;

three lugs, each of the three lungs extend beyond the perimeter of the core portion in a direction generally perpendicular to a longitudinal axis of the core portion, each of the three lugs comprising a planar surface forming respective portions of three sides of an equilateral triangle, each of the three planar surfaces correspond to a first portion of the length of the three respective sides of the equilateral triangle, and each planar surface is offset from the center of each respective side of the triangle; and three joining portions joining each of the three planar surfaces, each of the three joining portions are recessed relative to the planar surface adjacent to the respective joining portion, each of the three joining portions extend from near the center of the respective sides of the equilateral triangle and one of the planar surfaces toward another of the planar surfaces, and the three joining portions lay entirely within the equilateral triangle; wherein the three joining portions are one or more of substantially concave or substantially convex.

16. A driving force member according to claim 15, wherein the three planar surfaces correspond to substantially half of the length of each side of the equilateral triangle respectively.

17. A driving force member according to claim 15, wherein the three planar surfaces correspond to less than half the length of each side of the equilateral triangle respectively.

18. A driving force member according to claim 15, wherein one joining portion of the three joining portions is substantially concave and one is substantially convex.

19. A driving force member according to claim 15, wherein the driving force member contains an electroconductive portion.

20. A driving force member according to claim 15, wherein the driving force member is formed of an electroconductive material.

21. A driving force member according to claim 15, wherein the three planar surfaces are equally and radially spaced in the rotational direction of the driving force member.

* * * * *